United States Patent [19]

Hedenberg

[11] Patent Number: 4,803,086
[45] Date of Patent: Feb. 7, 1989

[54] AUTOMATICALLY MAKING FOOD PRODUCTS SUCH AS BREAD, CAKES AND THE LIKE

[75] Inventor: Gunnar Hedenberg, Uddevalla, Sweden

[73] Assignee: Heden-Team Aktiengesellschaft, Triesenberg, Liechtenstein

[21] Appl. No.: 93,741
[22] PCT Filed: Dec. 18, 1986
[86] PCT No.: PCT/EP86/00786
§ 371 Date: Jul. 22, 1987
§ 102(e) Date: Jul. 22, 1987
[87] PCT Pub. No.: WO87/03784
PCT Pub. Date: Jul. 2, 1987
[51] Int. Cl.⁴ .................. A47J 27/62; A47J 37/01
[52] U.S. Cl. .......................... 426/87; 99/348;
426/112; 426/113; 426/120; 426/124; 426/128;
426/232; 426/394; 426/412; 426/523
[58] Field of Search .............. 99/348, 484, 485, 486,
99/493; 426/87, 112, 113, 120, 124, 128, 394,
412, 523, 232

[56] References Cited

U.S. PATENT DOCUMENTS 4,203,357 5/1980 Vaussanvin ................. 99/348
4,363,407 12/1982 Buckler .
4,550,653 11/1985 Hedenberg .
4,550,654 11/1985 Hedenberg .
4,590,850 5/1986 Hedenberg .
4,651,877 3/1987 Adrianus .
4,731,250 3/1988 Stark ..................... 426/412

FOREIGN PATENT DOCUMENTS 0178013 4/1986 European Pat. Off. .
7431178 4/1976 France .
8403013 12/1985 Netherlands .

Primary Examiner—Robert W. Jenkins
Attorney, Agent, or Firm—Holman & Stern

[57] ABSTRACT

Apparatus for automatically making food products in piece form, such as loaves of bread, from dough-like substances, comprises a housing having holding drums (230,232) adapted to be fixed to either end of a flexible sealable bag (12) containing the ingredients. A dough preparation and baking chamber (212) has upper and lower slit openings (220,222). The bag is moved to and fro through the slit openings to perform kneading of the dough, and then baked in the chamber. The variable baking parameters dependent upon the particular ingredients and product are controlled dependent upon instructions read from the bag by a scanner (270). The instructions comprise a bar code (121) which can have a first identification portion to confirm that the bag is suitable for use in the apparatus and a second command portion to instruct the apparatus as to the baking sequence required.

14 Claims, 7 Drawing Sheets

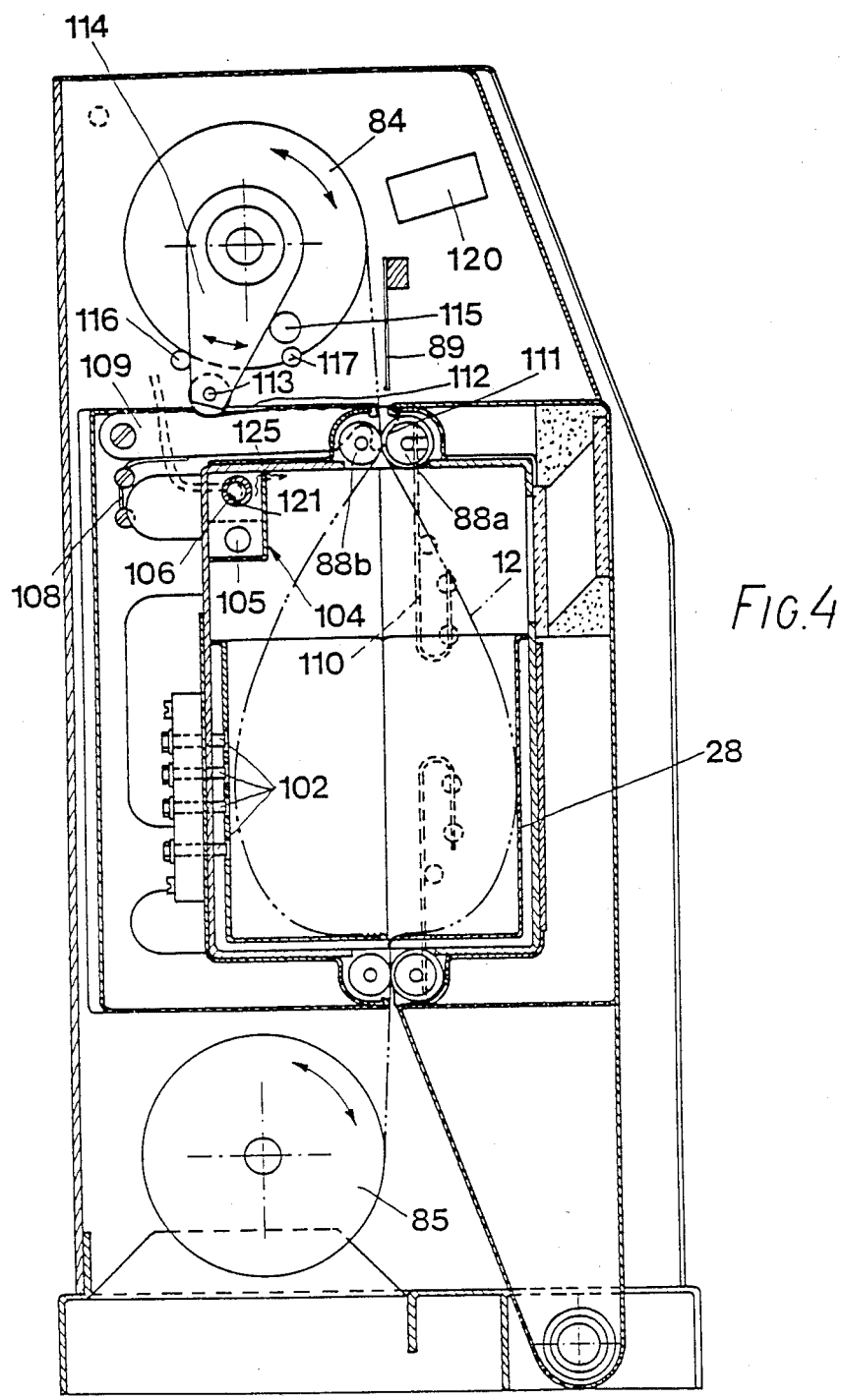

AUTOMATICALLY MAKING FOOD PRODUCTS SUCH AS BREAD, CAKES AND THE LIKE

BACKGROUND OF THE INVENTION

This invention relates to a method of and apparatus for automatically making food products such as bread, cakes and the like.

The invention is more particularly related to a baking apparatus for automatically making food products in piece form from dough-like substances. The apparatus may for example comprise a housing containing holding means adapted to be affixed to either end of a flexible sealable bag containing the ingredients for the dough-like substance, and a dough preparation station having an upper and a lower slit forming slit openings. Kneading means are included for mechanically working the ingredients in the bag, and the apparatus provides for relative movement between the bag and the kneading means so that the ingredients are kneaded into a dough-like substance. A heat treatment station is in said housing in which the kneaded dough-like substance is baked.

Baking e.g. bread for household purposes is a relatively complicated, time consuming, work intensive and messy business. Due to the fact that the quality of the bread to a certain extent depends on the fermentation time and that the fermentation procedure has to be performed under the correct conditions, which takes a relatively long time, there are few people who have the privilege of eating fresh home-made bread for breakfast.

In the EP-A No. 0 113 327 there is disclosed a baking apparatus of the above mentioned kind which can produce bread automatically without soiling various vessels and utensils, as the mixing and kneading operations of the dough takes place in a flexible sealable bag containing the necessary ingredients for the dough.

SUMMARY OF THE INVENTION

If the baking apparatus is to be of practical use it should be able to cope with variations in the type and quality of the ingredients used and be able to produce a variety of baked products. There is then a need to provide the baking apparatus with the necessary instructions to take account of these variations in a reliable and effective but uncomplicated manner.

The invention is defined in the claims below to which reference should now be made.

In an embodiment of this invention the baking apparatus receives a bag and reads from the bag a first identification indicia which confirms to the apparatus that the bag is of a type usable in the apparatus, followed by a second command indicia which instructs the apparatus as to the parameters appropriate to the particular baking operation required. Either or both of these indicia may take the form of a bar code, the apparatus then including an appropriate bar code reader.

BRIEF DESCRIPTION OF THE DRAWINGS

FIG. 4 shows a section through a second embodiment of the baking apparatus;

DESCRIPTION OF PREFERRED EMBODIMENTS

The baking apparatus illustrated is basically of the type described in EP-A No. 0 113 327 and consists of holding means 11, a flexible bag 12 attachable thereto and a common dough preparation and heat treatment station 13,14. The whole arrangement is located inside a thermally insulated casing 15.

Figure 6:
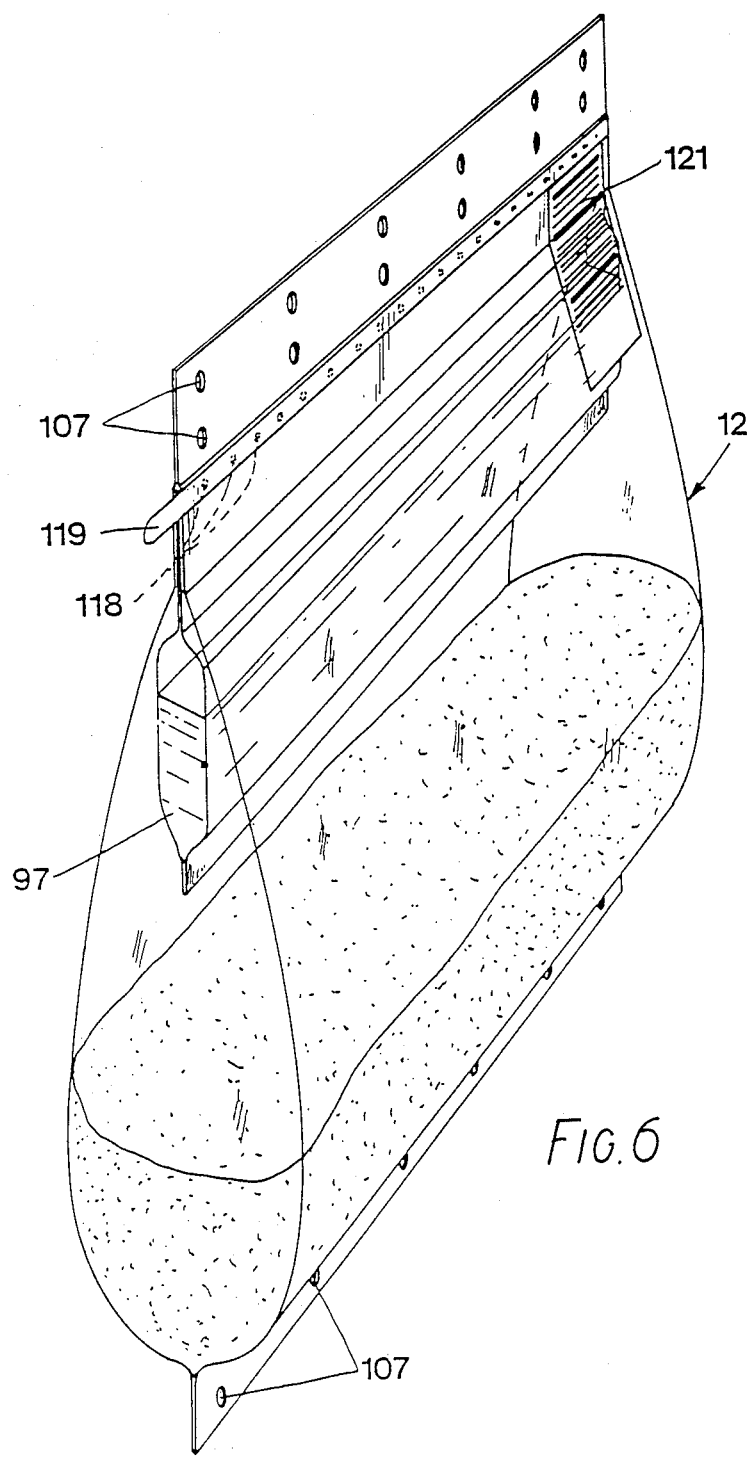
FIG. 6 is a perspective view of a bag used in the baking apparatus according to the invention.

The flexible bag 12, an embodiment of which is shown in FIG. 6, is used as a transportation package for the dry ingredients from the producer to the user and as a vessel during the preparation of the dough and possibly also during the baking. The bag 12 must therefore withstand rough mechanical treatment and preferably also contains a second bag or a separate compartment, in which is contained the liquid required for preparation of the dough. The compartments containing the dry ingredients and the baking liquid respectively are separated by e.g. a weld joint which is burst when the kneading operation starts. Alternatively, the liquid for the dough can also be added through a nozzle, especially if the liquid is only water. The bag 12 is attached to at least two holding means 11 which are so formed that the end oieces of the opening of the bag can be squeezed between gripping jaws 17.

A programmer interrupts the dough preparation after an empirically predetermined dough preparation time so that no overworking of the dough occurs which could lead to dry bread. The heater 23 in the heat treatment station 14 can already be started during the preparation of the dough in order to obtain an appropriate fermentation time. The dough can be made to ferment several times possibly interrupted by new kneading operations, depending upon the program in the programmer. When the fermentation of the dough is finished the baking takes place directly in the combined dough preparation and baking station 13,14.

Figure 1:
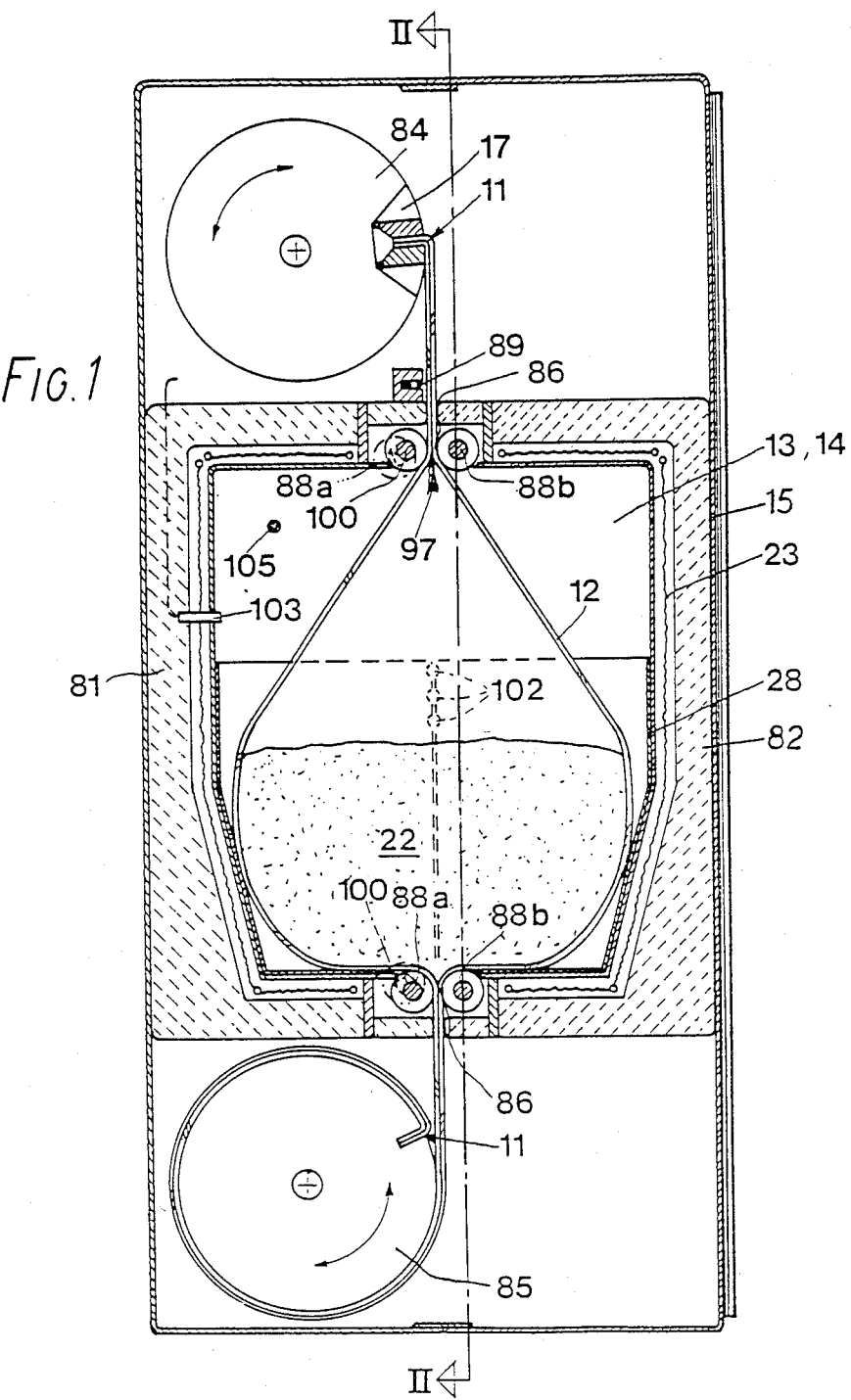
FIG. 1 shows a section through a first embodiment of the baking apparatus.

The embodiment shown in FIG. 1 comprises a common dough preparation and heat treatment station 13,14 consisting of two housing halves 81,82 of which the first one 81 is stationary while the second one 82 is displaceable or rotatable with respect to the stationary half. In the embodiment shown the movable housing half 82 is rotatable about a vertical hinge so that access can be obtained to the dough preparation and heat treatment stations 13,14 and the holding means.

The mixing of the ingredients and the dough preparation is sccomplished by attaching the upper end portion of the bag 12 to a aholding means 11 at an upper rotatable cylinder 84, while the lower end of the bag in a corresponding way is attached to another holding means 11 at a lower rotatable cylinder 85. The cylinders 84 and 85 are driven by a reversible motor (not shown) for about one revolution, after which the motor is reversed. In this way the bag 12 is given an oscillating up and downwards movement. The bag must pass through an upper and a lower slit-shaped opening 86 between the housing halves 81 and 82, which only permits a substantially empty bag to pass. This means that the content of the bag—the dough—will alternately be kneaded against the upper and lower part of the inner walls of the baking oven 14, where the slit 86 is located. In order to reduce the friction between the bag and the edge between the slit and the inner wall, these parts are provided with rolls 88a and 88b.

Practical tests have proved that a very effective mixing and kneading of the dough is achieved by this very simple device, even if the dough is relatively stiff.

The bags with the ingredients are preferably delivered hermetically sealed and if the baking recipe prescribes that the preparation of the dough and/or the baking should be made under atmospheric conditions it is appropriate to arrange a perforation and/or cutting device 89 which can perforate the bag in a certain position, so that the interior of the bag will communicate with the atmosphere.

Figure 2:
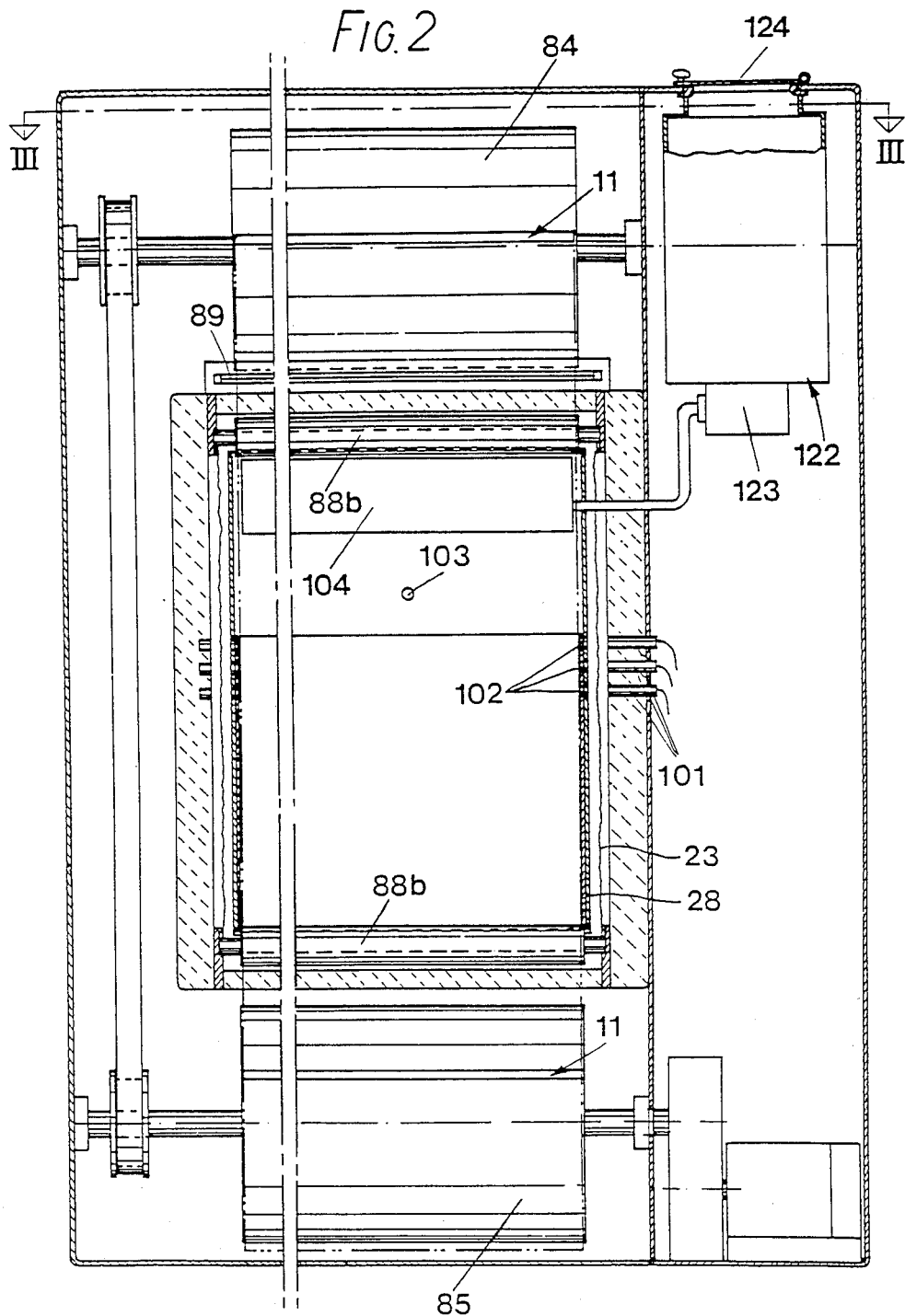
FIG. 2 is a section on the line II—II in FIG. 1.
Figure 3:
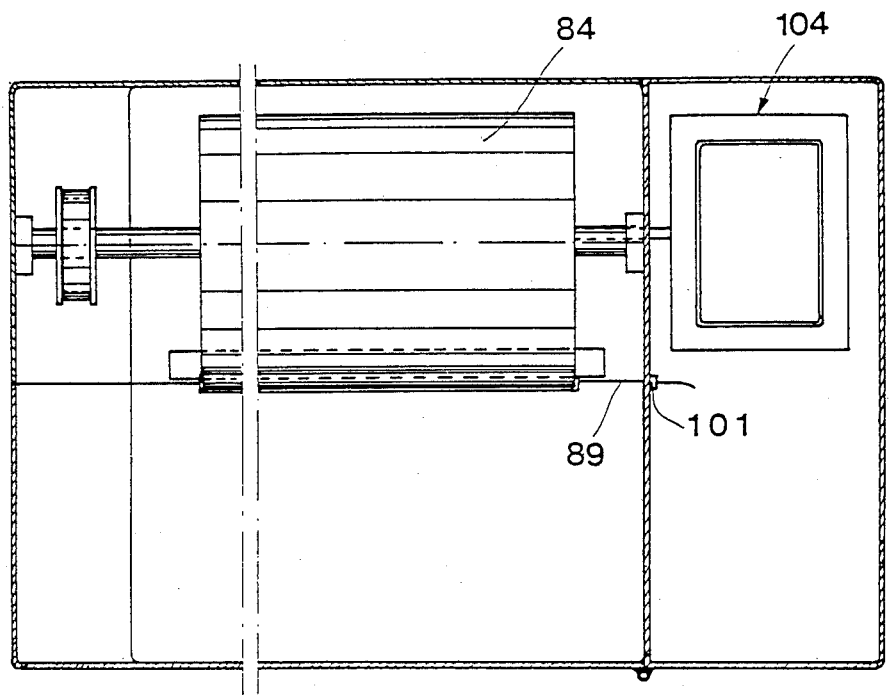
FIG. 3 is a section to the line III—III in FIG. 2.

In the embodiment shown in FIGS. 1–3 a baking tin 28 is arranged in the common dough preparation and heat treatment station 13,14. The baking tin 28 also consist of two parts, e.g. hingedly connected to each other along the same parting line as the housing halves 81,82 for washing purposes.

It usually is necessary to ventilate the bag 12 during the mixing and kneading operation due to formation of gas in the dough. One of the rolls 88a in each pair of rolls 88 between which the bag 12 passes is therefore displaceable in an inclined oblong groove 100 so that when the bag 12 is unrolled from the respective rotatable cylinders 84 or 85 the respective pair of rolls 88 is permitted to move apart a few millimeters, so that gas may escape between the rolls 88a and 88b and out of the bag through e.g. perforations 118 (FIG. 6). The opposite pair of rolls 88 are at the same time pressed together against the bag 12 and seal the opening thereof. If any dough would pass between the rolls 88a and 88b it will be allowed to pass back when the bag 12 is unrolled from the cylinders 84 or 85 and the rolls 88a and 88b are moved apart.

A similar function can be provided in other ways, e.g. by making one of the rolls 88 in each pair of rolls 88 spring-loaded and actuated by an electromagnet.

A cutting device 89 in the form of a heating filament is arranged to open the bag 12 after the mixing and kneading operation is finished. The dough is then pressed out of the bag 12 and is spread in the baking tin 28 when the bag is reeled on the rotatable roll 85 and removed from the dough preparation and heat treatment station 13,14 before the fermentation takes place.

A number of sensors, e.g. photocells 101, are arranged to detect the rise level of the dough in order to determine when the fermentation is sufficient. Apertures 102 are provided in the walls of the dough preparation and heat treatment station 13,14 and in the baking tin 28 just opposite the photocells 101.

A temperature sensor 103 sensing the temperature in the dough preparation and heat treatment station 13,14 is also provided.

A steam generator 104 is arranged in the dough preparation and heat treatment station 13,14 and is arranged to introduce steam into said station during and/or after the baking operation in order to produce a crust and/or glossy surface on the bread. The steam generator 104 (see also FIG. 4) comprises a heating rod 105 and a tube 106 which is perforated 121 and communicates with a water container 122 through a valve 123 controlling the supply of water to the steam generator 104. Water can be filled through an opening covered by a lid 124. The steam generated in the steam generator 104 can escape through a slit 125.

Figure 5:
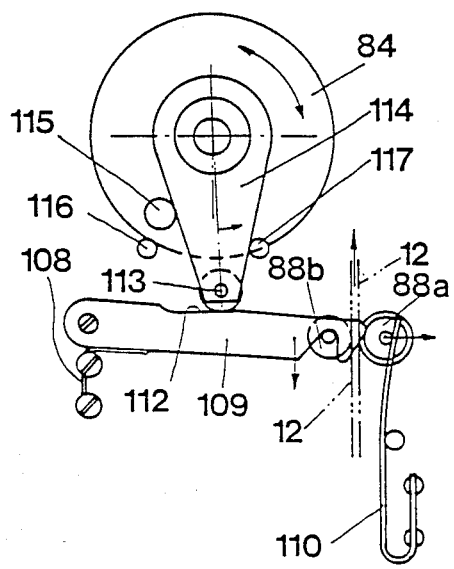
FIG. 5 shows a part of the baking oven of FIG. 4.

In the embodiment shown in FIGS. 4 and 5 the ventilation of the bag 12 is provided by means of a spring-loaded 108 lever arm 109 actuating the spring-loaded 110 roll 88a. The other roll 88b is fixed. The lever arm 109 has a surface 111 bearing against the roll 88a and is on its side facing the roll 88 provided with a small recess 112 with a slanting approach along which a roll 113 attached at an actuator in the form of a presser cam 114 can be moved. The presser cam 114 is rotatably attached to the hub of the cylinder 84 and is actuated by a driving pin 115 attached to the cylinder 84. Two stops 116 and 117 limit the movement of the presser cam 114.

In the position shown in FIG. 4 the roll 113 of the presser cam 114 is located in the recess 112 of the lever arm 109 which in this position does not exert any pressure on the roll 88a, which therefore is pressed against the fixed roll 88b by the spring 110. When the cylinder 84 is rotated in the counter clockwise direction the bag 12 is moved upwards between the rolls 88a and 88b which are pressed against each other and when the driving pin 115 reaches the presser cam 114 this will be moved together with the roll 84 until it reaches the stop 117. The roll 113 is then moved from the recess 112 and along the approach thereof, at which the lever arm 109 will be pressed downwards and exert a pressure on the roll 88a, which will lbe moved apart from the fixed roll 88b a short distance (FIG. 5).

The motor is then reversed and the cylinder 84 is rotated in clockwise direction, while the lever arm 109 will remain in the position shown in FIG. 5 until the driving pin 115 reaches the presser cam 114 and forces it to move to the position shown in FIG. 4 at which the lever arm 109 releases the roll 88a. Thus during the time the bag 12 is unrolled from the cylinder 84 the rolls 88a and 88b are moved apart allowing ventilation of the bag and/or the passage of possible dough residues in the bag that might have come along with the bag.

The gas may escape out of the bag 12 through perforations 118 (FIG. 6), which before use of the bag are covered by an adhesive tape 119 or the like. Alternatively the upper edge which seals the bag 12 is torn away before the bag is attached to the cylinder 84 and 85 between gripping jaws 17 (FIG. 1). One or both gripping jaws 17 can be provided with a cogging or similar irregularities, so that gas may escape therebetween.

A bar code scanner 120 reading a bar code 121 applied or printed on the upper portion of the bag 12 (see FIG. 6) is arranged just opposite the upper cylinder 84. The bar code 120 contains the baking program, such as mixing and kneading time, speed of the cylinders, fermentation time and temperature, baking time and temperature, steam generation etc. The bar code scanner 121 initiates the programmer which takes care of the whole production process. It is important to note that the bar code 121 is read before the bag 12 is wound up on the cylinder 84, which can stretch the bag and destroy the bar code symbols.

The bar code scanner preferably comprises a CCD (charge coupled device) line scan image sensor such as the Fairchild CCD III 256 element sensor available from Fairchild Camera and Instrument Corporation, 4001 Miranda Avenue, Palo Alto, CA. The output of the scanner feeds the programmer which can comprise any suitable commercially available microprocessor to provide stored program control appropriate to the type of bread etc. being baked. There are several variables in the kneading and baking operation. For example, in a typical bread-making sequence the bag will initially be moved between the rolls to break the water bag or seal and then held steady while the water penetrates the dry ingredients. Then kneading commences which may take place at a high speed continuously or at a lower speed and intermittently. After the first kneading operation there will then normally be a rising period while the dough rises. This can be followed by a second kneading and rising, after, or during, which baking commences. Baking continues for a set time and temperature, during which steam may or may not be introduced.

The durations of all these operations have to be set. Wide variation in the parameters is permissible, depending upon the type of bread to be produced and the nature of the flour used. In particular differences will arise depending upon the relative proportions of wheat and rye flour. The necessary parameters can only effectively be determined empirically.

It will be seen, therefore, that there is a need to instruct the machine as to what the values of these parameters are. In practice it is possible for the machine to hold several sets of predetermined values for a range of breads and then it is only necessary to instruct the machine to select the appropriate set. Variations on these sets can be obtained by instructing the machine to select one set but to vary one or two, say, of the parameters.

The bar code scanner 120 reads the bar code 121 on the bag to obtain information from the bag as to which parameters are required for that particular bag. The code is read with the bag conforming around the surface of the upper rotatable cylinder 84 so that it is evenly stretched and thus reliably read, but is not yet stretched by the kneading such as might distort the bar code. Furthermore, because the bag is driven by the motor at a set speed, the bar code passes under the scanner 120 at a constant and even speed, again aiding very reliable reading.

Preferably the code or other indicia being read on the bag comprises two parts. The first or identification part serves to identify that the bag is an appropriate bag for that type of machine, and is one that the machine can operate with. Thus this first indicia enables the microprocessor so that it can be programmed by the second indicia or part of the bar code. The second or command indicia then instructs the microprocessor in relation to the appropriate baking sequence for that bag. The microprocessor only responds to the second indicia if the scanner has correctly detected the first indicia.

The total length of the bar code can be of the order of 30 digits. If the first part of the bar code is the first or identification indicia referred to above, then typically the first 5 to 15 digits can constitute the first indicia, and this can correspond to a number identifying the particular supplier of the bag in accordance with a standard article numbering scheme. The remaining digits constitute the second or command indicia. The code used can conveniently be that known as the interleaved 2 of 5 code.

Other means than bar codes can be used for either or both the identification and command indicia discussed above. One may be a bar code and the other a characteristic design or figure. As noted above the command indicia can comprise the full kneading and baking parameters required, or indicate a selected one of a plurality of preprogrammed parameters. Which method is chosen depends to some extent on the number of digits in the command indicia.

The cutting device 89 in the embodiment of FIG. 4 consists of a bimetallic member which when heated will bend and be brought into contact with the bag and cut this off. The bag 12 will then be wound up on the roll 85 while the dough remains in the baking tin 28.

Alternatively the attachment of the bag 12 at the upper cylinder 84 is released after the kneading operation is finished and the bag is wound up in the lower cylinder 85 at the same time as the dough is pressed out of the upper open end of the bag. The gripping jaws 17 can e.g. be actuated by an electromagnet. In this case the cutting device 89 can be eliminated.

In order to prevent any dough residues from penetrating between the lower pair of rolls 88 during the fermentation and baking it can be appropriate not to wind the entire emptied bag 12 on the cylinder 84, but to leave the free end of the bag between the rolls 88 as a seal.

In FIG. 6 is shown a perspective view of a bag 12 containing the dry ingredients for the dough and an inner bag 97 with the baking liquid. The sealed upper and lower side edges of the bag 12 may be provided with perforations 107. The bag 12 may at its upper portion be provided with a bar code 121 as described above. The liquid may instead be contained in a separate compartment in the lower part of the bag separated from the dry ingredients by a breakable seal which is burst when the bag passes between the rolls 88.

Figure 7:
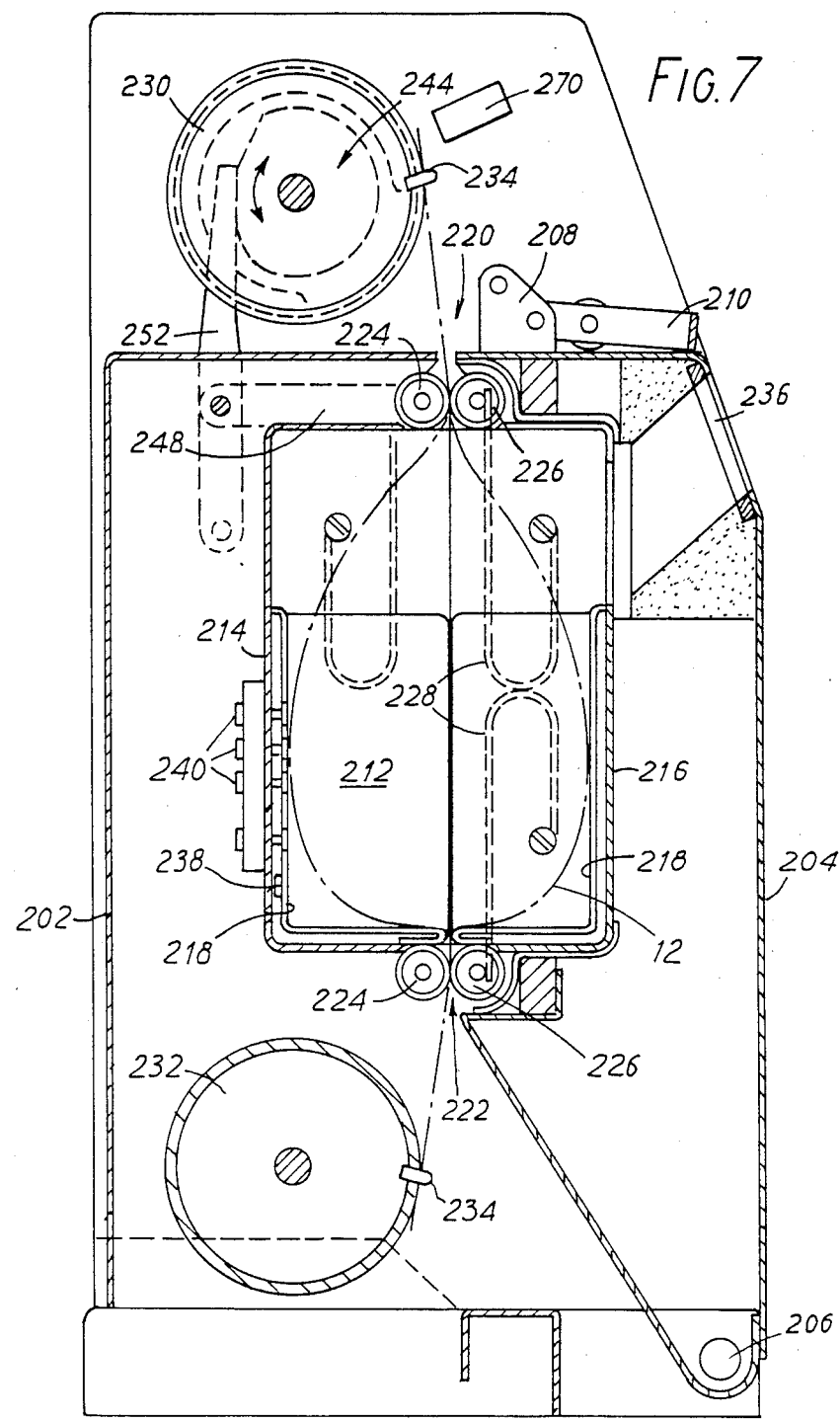
FIG. 7 shows a section through a third embodiment having a different means for opening the rolls.
Figure 8:
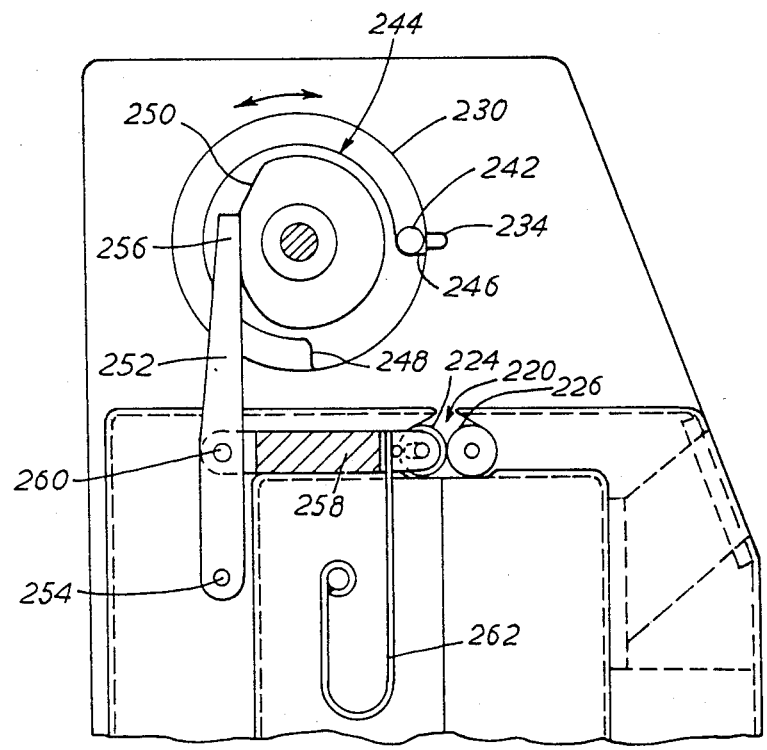
FIG. 8 is a detail similar to FIG. 5 for the embodiment of FIG. 7.

The bread-making apparatus 200 illustrated in FIGS. 7 and 8 is based on that shown in FIG. 4 and comprises two housing halves 202,204, of which one half 204 is openable by pivoting about a pivot 206. Latch means 208 are provided incorporated with the opening handle 210 to hold the housing closed. The kneading and baking chamber 212 is formed in two opposed parts 214,216 of the fixed and openable halves of the machine and linings 218 are provided for the open portion of the chamber 212, namely the lower part thereof. The chamber 212 has a slit opening 220 at its top and another 222 at its bottom formed on the join line of the two halves and each comprising opposed rolls 224 on the fixed part and 226 on the openable part. The rolls 226 are biased by springs 228 towards the opposed rolls 224 on the fixed part.

The bag 12 runs between the rolls as described for the preceding embodiments and extends over an upper cylindrical drum 230 and a lower cylindrical drum 232. The drums are driven together as previously described to move the bag up and down during the kneading operation. In this instance the drums are provided with a line of spaced pins 234. The bag is provided with a corresponding line of apertures at each of its upper and lower edges which engage over the pins. No cutting means is provided for the bag as was the case in FIG. 4, but instead the bag is wound downwardly to pull the bag off the pins 234 on the upper drum 230 when the contents of the bag are to be emptied into the baking chamber 212, the bag then being wound on the lower drum 232.

The housing has a window 236 to allow the user to look into the oven and a light (not shown) to illuminate the interior of the chamber, operated by a push-button switch so that it is only on when the user is actually looking inside. Otherwise the heat from the lamp upsets the temperature. A temperature sensor 238 is provided in the oven and height sensors 240 similar to the photocells 101 of FIG. 4 but preferably taking the form of moisture sensors to sense contact with the damp dough.

The machine of FIG. 7 includes a bar code scanner 270 located similarly to the scanner of FIG. 4 and similarly operative to read the one or two-part bar code 121 on the bag as shown in FIG. 6.

The arrangement for opening and closing the slot 220 differs from that of FIG. 4 and is shown in more detail in FIG. 8. The drum 230 carries a pin 242 which rotates with the drum. Loosely mounted on the same shaft as the drum is a cam member 244 which has two portions. The first portion provides two abutments 246,248 which can bear against the pin 242, these abutments being spaced to permit the pin to rotate freely through about 270° relative to the cam member. The second portion of the cam member 244 is axially spaced from the first and provides a cam surface 250. A lever 252 pivoted about a fixed pivot 254 has an end portion 256 which bears against the cam surface 250. A connecting rod 258 is pivoted at 260 to an intermediate portion of the lever 252 and is connected by a lost-motion pin and slot connection to the roll 224. A spring 262 bears against the roll 224 to bias it towards the opposed roll 226. The entire arrangement is duplicated at the other end of the drum.

In the position shown in FIG. 8 the bag is assumed to be at the bottom of its travel. During the last part of its movement it has moved the cam member 244 to the position shown so that the lever 252 and connecting rod 258 are moved to the right, allowing the spring 262 to force the roll 224 against the roll 226 to close the slit. When the bag then moves up again the pin will rotate until it strikes the other abutment surface 248. This rotates the cam member 244 to move the lever 252 and connecting rod 258 to the left thus pulling the roll 224 away from the roll 226 against the spring 262 and opening the slit 220. The cam surface 250 has two flat portions against which the lever 252 bears at the upper and lowermost positions of the bag. The use of such flat portions rather than a continuous curve assists in stopping undesired rotation of the cam member 244 as the drum 230 commences its reverse rotational movement.

The invention is not limited to the embodiments described and shown but a plurality of modifications and combinations of details from the different embodiments are possible within the scope of the claims. It would e.g. be possible to have the heat treatment station separated from the dough preparation station, at which the prepared dough is pressed out of the bag into a baking tin placed in the heat treatment station. The heat treatment station may consist of a baking oven which is displaceable from a position in which it can receive the dough from the bag to baking position or alternatively the baking tin is displaceable with respect to the heat treatment station.

The baking apparatus may further be provided with a fan which leads air into a hallow bottom plate of the apparatus for cooling the electronic components and ventilating the baking oven after the baking.

I claim:

1. Apparatus for automatically making food products in piece form from dough-like substances, comprising a housing containing holding means adapted to be affixed to opposed edges of a flexible bag containing ingredients for the dough-like substance, kneading means for mechanically working the ingredients in the bag and including moving means for creating relative movement between the bag and the kneading means so that the ingredients are kneaded into a dough-like substance, heat treatment means for baking the kneaded dough-like substance, and programmable control means for controlling the sequential operation of the kneading means and heat treatment means, wherein the apparatus further comprises scanning means located adjacent the path of the bag as moved by the moving means for reading machine-readable indicia on a bag and for providing an output coupled to the control means to command operation of the control means.

2. Apparatus according to claim 1, in which the scanning means is adapted to read first indicia to provide identification that the bag is of a type suitable for use in the apparatus and second indicia adjacent the first indicia to provide automatic commands to the apparatus determinative of selected parameters relative to the kneading and heat treatment means.

3. Apparatus according to claim 2, in which at least one of said indicia comprises a bar code or part thereof.

4. Apparatus according to claim 2, in which said first indicia comprises a characteristic design or figure.

5. Apparatus according to claim 2, in which the control means is enabled in response to the first indicia to accept commands in response to the second indicia.

6. Apparatus according to claim 1, in which the holding means comprise upper and lower cylindrical drums for receiving the opposed edges of the flexible bag, and the kneading means comprise an upper and a lower pair of opposed rolls each adapted to provide a slit opening therebetween through which a bag can pass, and means for opening the upper rolls to permit gases in the bag to escape the opening means comprising cam means at opposed ends of the upper drum rotatable about the axis of rotation of the drum, abutment means on the drum and the cam means for causing the cam means to reciprocate between a first and a second position upon reciprocatory rotational movement of the drum, the cam means having a peripheral cam surface thereon, pivotable lever means engaging on the cam surface to be pivoted thereby and connection means longitudinally movable by the lever means to cause translational movement of one of the pair of upper rolls towards and away from the other.

7. A machine method of automatically making food products in piece form from dough-like substances, comprising the steps of providing a bag containing ingredients for the dough-like substance, creating relative movement between the bag and kneading means such as to mechanically work the ingredients in the bag to knead the ingredients into a dough-like substance, and baking the dough-like substance, the kneading and baking being controlled by a stored program, wherein the method further comprises an initial step of automatically scanning the bag in its path of movement to read machine-readable indicia on the bag and commanding the stored program to control the kneading and baking steps in dependence thereon.

8. A method according to claim 7, in which the scanning step comprises scanning a first machine-readable indicia to provide identification of the suitability of the bag for use in the method and scanning a second machine-readable indicia adjacent the first to provide automatic commands for the stored program determinative of selected parameters relative to the kneading snd baking steps appropriate to the ingredients in the bsg.

9. A method according to claim 8, in which at least one of said first and second indicia comprises a bar code or part thereof.

10. A method according to claim 8, in which said first indicia comprises a characteristic design or figure.

11. A flexible sealable bag containing at least the dry ingredients for making a food product in piece form from dough-like substances by kneading and baking, the bag having applied thereon first machine-readable indicia adapted to provide identification to an apparatus of the type of apparatus for which the bag is suitable and second machine-readable indicia adjacent the first indicia adapted to provide automatic commands to the apparatus determinative of selected parameters relative to the kneading and baking operations appropriate to the ingredients.

12. A bag according to claim 11, in which at least one of said first and second indicia comprises a bar code or part thereof.

13. A bag according to claim 11, in which said first indicia comprises a characteristic design or figure.

14. A bag according to claim 11, in which the bag has two compartments separated by mechanically rupturable seal means, one compartment containing dry ingredients and the other compartment being adapted to contain liquid ingredients.

* * * * *